Dec. 29, 1953  G. R. RYAN  2,664,085
VENOCLYSIS EQUIPMENT
Filed June 15, 1950  3 Sheets-Sheet 1
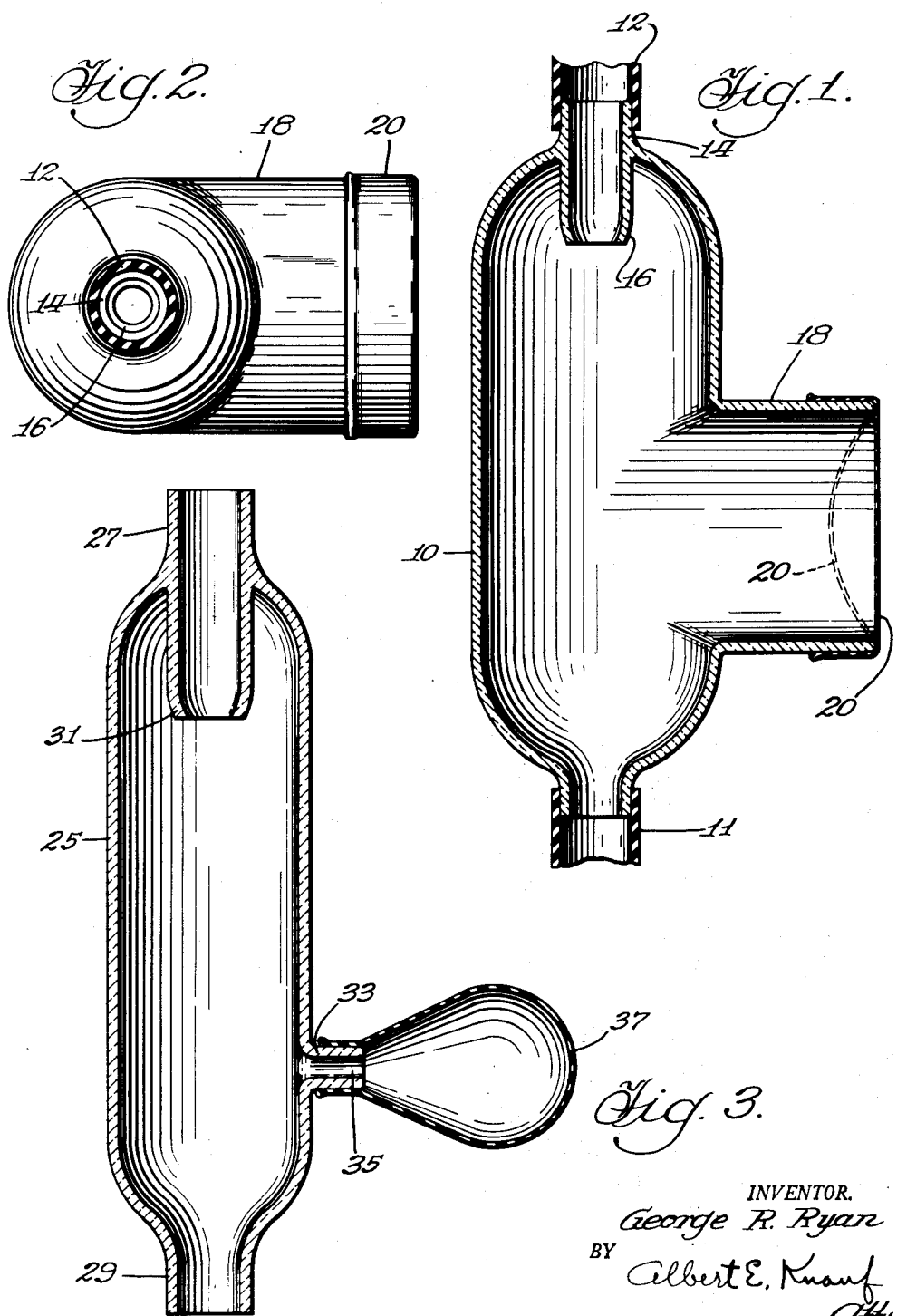
INVENTOR.
George R. Ryan
BY Albert E. Knauf
Atty

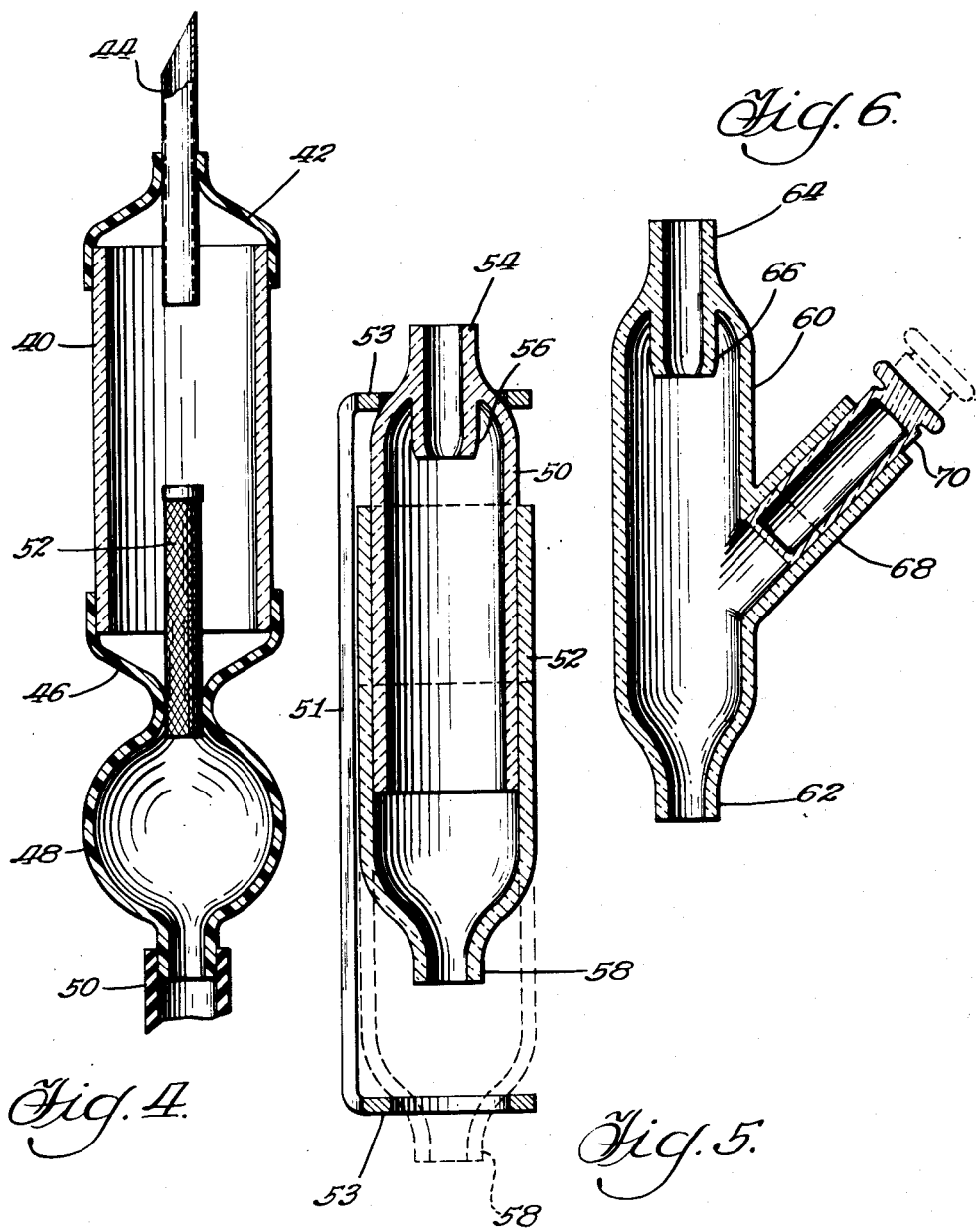

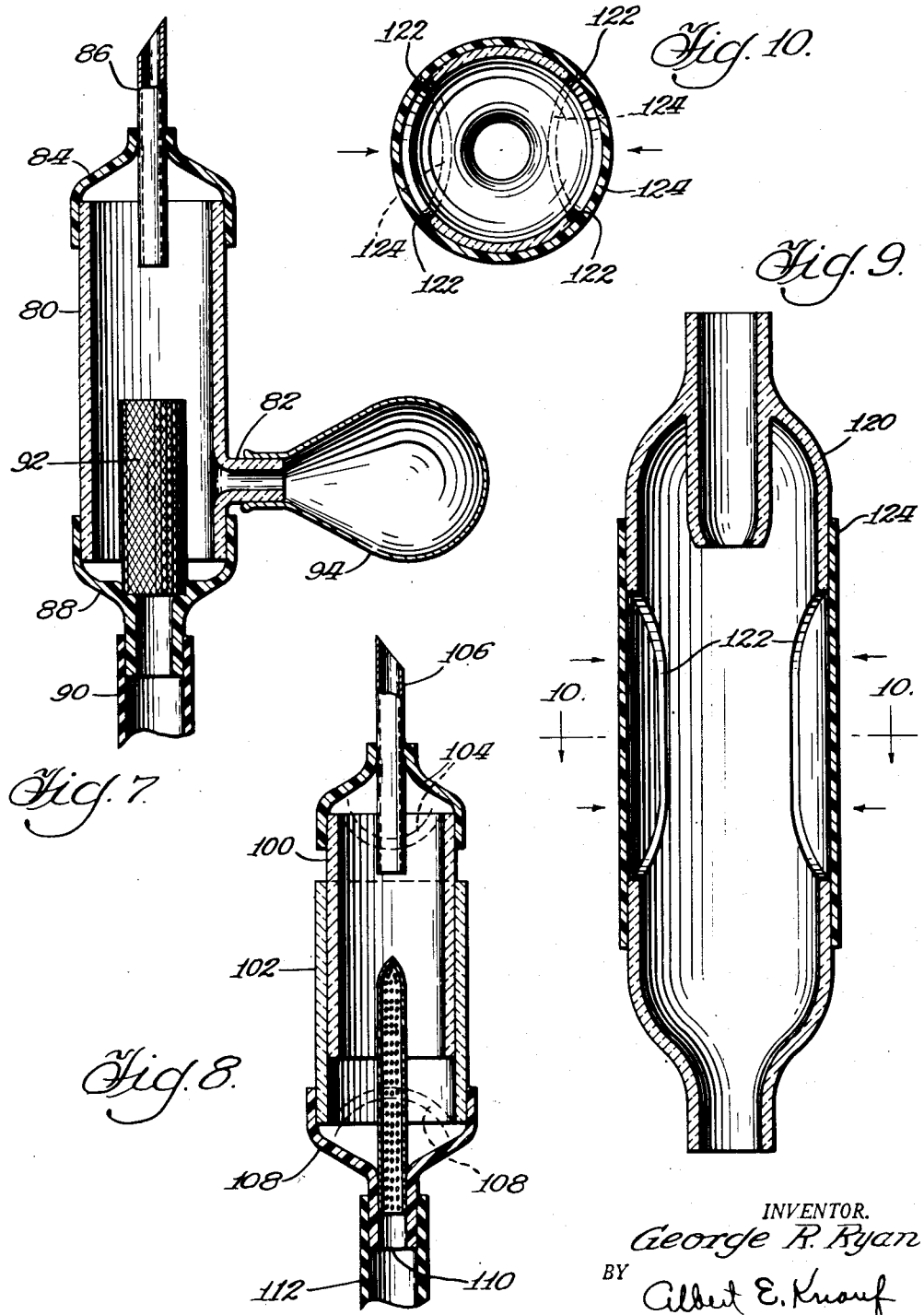

Patented Dec. 29, 1953

2,664,085

UNITED STATES PATENT OFFICE 2,664,085

VENOCLYSIS EQUIPMENT

George R. Ryan, Waukegan, Ill., assignor to Abbott Laboratories, North Chicago, Ill., a corporation of Illinois Application June 15, 1950, Serial No. 168,187

11 Claims. (Cl. 128—214)

My invention relates to venoclysis equipment and more particularly to variable volume drip chambers for use in the administration of parenteral fluids.

In the art of venoclysis, i. e. transferring parenteral fluids from a flask or container to the veins of a patient, it is important to be able to regulate the flow of such fluids. Generally, the fluid is administered from the container to the patient by means of a length of tubing connected therebetween, and the rate of flow of the fluid during administration is quite low, being in the order of 30 to 300 drops a minute. The flow through the tubing is controlled by a clamping device on the tubing, and is determined by visually counting the drops falling through a drip chamber or metering device, as for instance a Murphy drip chamber.

The drip chamber may be connected directly to the container, or incorporated in the tubing somewhere between the container and the patient. With a material requiring it, a filter may be used in conjunction with the venoclysis equipment, being disposed either in the container itself or in the drip chamber, so as to filter the fluid passing into the veins of the patient. In any of the positions, and whether with a filter or not, the operation of the drip chamber is the same. The liquid is allowed to run through the drip chamber and through the tubing to expel the air from the tubing. The drip chamber is partially filled with liquid, so that no air may enter the tubing, and in the case of the drip chamber with the incorporated filter, the level of the liquid must be above the filter. When the tubing is free from air, that is, solidly filled with fluid, and the liquid level is adjusted to the right height in the drip chamber, the tubing is connected via a hypodermic needle to the patient. The rate of flow of the liquid entering the patient's vein is adjusted by means of the tubing clamp.

In the use of such equipment, especially during the administration of blood and plasma, a clot may clog the inlet to the drip chamber stopping the flow therein. In the equipment of the prior art it is generally necessary to disassemble the equipment, remove the clot, reassemble, and start all over with the various manipulations to condition the equipment for further use.

Also it not infrequently happens, especially during somewhat prolonged administration, or as a result of manipulation to dislodge a blood clot, the liquid level in the drip chamber gets too high so that the dropping of the fluid cannot be observed. With drip chambers of the prior art, this condition, commonly referred to as a "flooded" drip chamber, generally necessitates taking the apparatus apart. According to the present invention, I have discovered that a drip chamber having a variable volume capacity eliminates the disadvantages of the prior art. As for instance, when a flooded drip chamber is encountered with apparatus according to the invention, the user merely closes the delivery tube near the drip chamber and inverts the drip chamber and container so that the drip chamber is above the container. In this position, the liquid from the drip chamber may be pumped into the container by varying the volume of the drip chamber. In this way the drip chamber can be partially or completely emptied of liquid and refilled with air from the container. The drip chamber and the container are then inverted and the liquid is pumped into the drip chamber to the desired height, and administration is continued by releasing the tubing clamp.

Referring to the accompanying drawings:

Figure 1 is a longitudinal section of a drip chamber according to the invention;

Figure 2 is a plan view of the device of Fig. 1;

Figure 3 is a longitudinal cross section of a modified device according to the invention;

Figure 4 is a longitudinal cross section of a drip chamber with an incorporated filter;

Figure 5 is a longitudinal cross section of a modified variable volume drip chamber;

Figure 6 is a longitudinal section of another modified drip chamber;

Figure 7 is a longitudinal cross section of a drip chamber with an incorporated filter;

Figure 8 is a modification of the drip chamber of Fig. 5.

Figure 9 is a longitudinal section of a side window construction; and

Figure 10 is a section on line 10—10 of Fig. 9.

In the embodiment of the invention selected for illustration in Fig. 1, the drip chamber comprises a main barrel 10 of glass or a suitable material. The barrel 10 is tapered at both ends for connection with a resilient tubing 11, 12, respectively. The small inlet 14 at the upper end of the drip chamber extends into the drip chamber and forms the dropping nozzle 16. A side arm 18 of about the same diameter as the barrel 10 is welded onto the main barrel of the drip chamber. The open end of the side arm 18 is covered by a resilient membrane 20 such as a rubber or like membrane.

In operation, the device of Fig. 1 is inserted in the tubing of a venoclysis set adjacent the bottle or container of fluid. The container is inverted and suspended from a stand so that the drip chamber hangs below the container. Fluid from the container is permitted to run through the drip chamber and into the tube leading therefrom, and at such a rate as to expel the air from the outlet tubing. The level in the drip chamber 10 may be varied by depressing the membrane 20 to change the volume of the drip chamber. Depressing the membrane 20 forces air from the drip chamber 10 through the nozzle 16 and back into the fluid container.

When the drip chamber 10 becomes flooded or completely filled with liquid, the fluid container is turned upright so that the drip chamber 10 is above the container. The outlet tube 11 is clamped shut, and by alternately depressing and releasing the membrane 20 a pumping action is obtained whereby the fluid in the drip chamber 10 is pumped back into the container. When the drip chamber is so emptied, the container is again inverted, and the membrane 20 is again pumped to permit liquid to flow back into the drip chamber at a desired height. When the fluid is at a desired height, tube 11 is reopened and the administration is continued.

The device of Fig. 3 comprises a main tube body 25 made of glass or a suitable material, having an inlet 27 and an outlet 29. The inlet 27 extends into the interior of the main tube 25 forming a dropping nozzle 31 for metering the liquid flowing therethrough. Welded onto the side of the main barrel 25 is a small side arm 33 having a hole 35 therethrough and communicating with the interior of the drip chamber. A resilient bulb 37 is attached to the side arm 33.

The bulb 37 of Fig. 3 is squeezed and released to obtain the pumping action described for the membrane 20 of the device of Fig. 1. By such pumping action the drip chamber 25 may be emptied and filled as desired.

The device of Fig. 4 is a modified drip chamber which comprises a main barrel 40 preferably made of glass and of relatively constant diameter. One end of the barrel 40 is covered with a resilient cap 42 which fits tightly over the outside of the barrel 40. A cannula 44 extends through the cap 42 to the interior of the tube 40. The cannula 44 is adapted to be pushed through the stopper of the fluid container, forming an outlet for the container.

The opposite end of the barrel 40 is covered by a cap 46 having a bulb-like portion 48 integrally attached therethrough. The bottom of the bulb 48 is attached to the venoclysis tubing 50. A filter 52 is attached to the neck-like portion of the junction between the cap 46 and the bulb 48. The filter 52 may be a perforated plastic tube, metal screen and the like.

In operation, the device of Fig. 4 is attached to the fluid container by inserting the cannula 44 through the stopper of the container. The container is then inverted and fluid is allowed to run through the cannula 44 into the drip chamber 40. The filter 52 filters the liquid leaving the drip chamber 40. In this case the fluid level in the drip chamber must be above the filter 52, to prevent air from entering the tubing 50. By squeezing and releasing the resilient bulb 48, the pumping action for varying the height of the drip chamber, as explained above, is obtained.

The variable volume drip chamber shown in Fig. 5 comprises an inner tube 50 and a tight fitting outer tube 52. The upper end of the inner tube is drawn down to the small diameter inlet 54. The inlet 54 extends into the body of the tube 50 forming a dropping nozzle 56. The outer tube 52 is drawn down to a small outlet 58. The drip chamber is incorporated in the venoclysis set by attaching tubing to the ends 54 and 58. The volume of the drip chamber may be varied by pulling the two tubes lengthwise to the position shown by the broken lines of Fig. 5. The pumping action of the drip chamber is accomplished by pulling and pushing the two tubes together, whereby the height of the liquid in the drip chamber may be varied as described above. Means are provided for preventing accidental separation of the tubes 50 and 52. I have illustrated a simple clip 51, having end wings 53 encircling the tapered portions at the ends of the tubes.

The device of Fig. 6 comprises a main tube 60 having an outlet 62 and an inlet 64. The inlet 64 extends into the interior of tube 60 forming the dropping nozzle 66. The tube 60 has a side arm 68 welded therein. A tight fitting piston 70 is inserted in the side arm 68. The pumping action of the drip chamber is obtained by moving the piston 70 in and out whereby the height of the liquid in the drip chamber 60 is varied as described above. The drip chamber is incorporated in a venoclysis set by attaching the tubing to the ends 62 and 64.

The device of Fig. 7 is a modification of the drip chamber shown in Fig. 3, and comprises a main tube 80 having a small side arm 82 welded thereon. One end of the tube 80 is covered by a resilient cap 84, having a cannula 86 extending therethrough. The opposite end of the tube 80 is covered by a resilient cap 88 attached to the venoclysis tubing 90. A filter 92 is sealed into the cap 88 for filtering the liquid passing through the chamber 80. Attached to the side arm 82 is a resilient bulb 94, which is adapted to be squeezed and released giving the pumping action described for the devices above.

The device of Fig. 8 is a modification of the drip chamber shown in Fig. 5. The device comprises a tube 100 slidably disposed in tube 102 forming a tight fitting therewith. The outer end of the tube 100 is covered by a cap 104, having a cannula 106 extending therethrough into the interior of the tube 100. The outer end of tube 102 is covered by a resilient cap 108, the outlet 110 of which is attached to the venoclysis tube 112. A length of perforated resilient tubing is sealed in the outlet 110 of the cap 108 for filtering the fluid passing through the drip chamber. The volume of the drip chamber may be varied by moving the two tubes relative to each other, whereby the height of the liquid in the drip chamber is varied. The caps 104 and 108 may be of flexible sheet materials in which case the pumping action may be produced without displacement of tubes 100 and 102, by merely pushing up on the tube 112, so that the caps assume the configuration indicated in dotted lines.

In Fig. 9 the glass tube 120 has oppositely disposed windows 122, each occupying about 90 degrees circumferentially, and each about twice as long as it is wide. A tight-fitting transparent elastic tube 124 is telescoped over the tube 120 to seal both windows. It will be apparent that pressure applied with the finger tips in the direction indicated by the arrows in Fig. 10 will press portions of the tube 124 into the windows 122 and secure the desired pumping action.

Others may readily adapt the invention for use under various conditions of service, by employing one or more of the novel features disclosed or equivalents thereof. As at present advised with respect to the apparent scope of my invention, I desire to claim the following subject matter.

I claim:

1. In venoclysis equipment for transferring parenteral fluids from a storage container to the veins of a patient through tubular connecting means, an improved drip chamber comprising a rigid transparent main chamber; a first tubular connecting means extending up from said main chamber for debouching in the fluid in said storage container; means directly associated with said main chamber for varying the effective volume of said main chamber by an amount greater than the interior volume of said tubular connecting means; and a second tubular connecting means to deliver a stream of fluid coming from said main chamber; said main chamber having inlet means shaped to deliver incoming fluid at a point where the flow can be seen.

2. In venoclysis equipment for transferring parenteral fluids from a storage container to the veins of a patient through tubular connecting means, an improved drip chamber comprising a rigid transparent main chamber; a first tubular connecting means extending up from said main chamber and debouching in the fluid in said storage container; means directly associated with said main chamber for varying the effective volume of said main chamber by an amount greater than the interior volume of said tubular connecting means; and a second tubular connecting means to deliver a stream of fluid coming from said main chamber; said main chamber having inlet means shaped to deliver incoming fluid at a point where the flow can be seen; said chamber being formed in telescoping parts, whereby relative axial movement of the parts is effective to vary the volume of the chamber.

3. A drip chamber for venoclysis equipment comprising, in combination: a rigid transparent main chamber; a first tubular connecting means extending up from said main chamber for debouching in a fluid container; flexible means directly associated with the said rigid chamber for varying the effective internal volume of said main chamber by an amount greater than the interior volume of said tubular connecting means; said flexible means including an auxiliary chamber communicating with said main chamber and flexible walls defining at least a portion of said auxiliary chamber whereby external pressure applied to said flexible walls varys the effective internal volume of the said main chamber; and a second tubular connecting means to deliver a stream of fluid coming from said main chamber; said main chamber having inlet means shaped to deliver incoming fluid at a point where the flow can be observed.

4. A drip chamber for venoclysis equipment comprising, in combination: a rigid transparent main chamber; a first tubular connecting means extending up from said main chamber for debouching in a fluid container; a flexible means directly associated with said rigid chamber for varying the effective internal volume of said main chamber by an amount greater than the interior volume of said tubular connecting means; said flexible means including an auxiliary chamber communicating with said main chamber and flexible walls defining at least a portion of said auxiliary chamber whereby external pressure applied to said flexible walls varys the effective internal volume of the said chamber; said auxiliary chamber being a flexible rubber bulb having a reduced neck; said chamber having a laterally extending tubular boss fitting in said neck and having inlet means shaped to deliver incoming fluid at a point where the flow can be observed; and a second tubular connecting means to deliver a stream of fluid coming from said main chamber.

5. A drip chamber for venoclysis equipment comprising, in combination: a rigid transparent main chamber; a first tubular connecting means extending up from said main chamber for debouching in a fluid container; flexible means directly associated with said rigid chamber for varying the effective internal space in said main chamber by an amount greater than the interior volume of said tubular connecting means, whereby an effective pumping action can be obtained by pressure on said flexible means; said flexible means including an auxiliary chamber communicating with said main chamber and flexible walls defining at least a portion of said auxiliary chamber; and a second tubular connecting means to deliver a stream of fluid coming from said main chamber; said auxiliary chamber being interposed between the main chamber and the said second tubular connecting means; said main chamber having inlet means shaped to deliver incoming fluid at a point where the flow can be observed.

6. A drip chamber for venoclysis equipment comprising, in combination: a rigid transparent main chamber; a first tubular connecting means extending up from said main chamber for debouching in a fluid container; flexible means directly associated with said rigid chamber for varying the effective internal volume in the main chamber by an amount greater than the internal volume of said tubular connecting means, whereby an effective pumping action can be obtained by pressure on said flexible means; said flexible means including an auxiliary chamber communicating with said main chamber and flexible walls defining at least a portion of said auxiliary chamber; and a second tubular connecting means to deliver a stream of fluid coming from said chamber; said auxiliary chamber being a flexible spherical body having diametrically opposite aligned tubular necks; one neck being inserted in said second tubular connecting means and the other neck communicating with main chamber; said main chamber having inlet means shaped to deliver incoming fluid at a point where the flow can be observed.

7. A drip chamber for venoclysis equipment comprising, in combination: a rigid transparent main chamber; a first tubular connecting means extending up from the main chamber for debouching in a fluid container; flexible means directly associated with said rigid chamber for varying the effective internal volume of said main chamber being an amount greater than the interior volume of said tubular connecting means; said flexible means including an auxiliary chamber communicating with said main chamber and flexible walls defining at least a portion of said auxiliary chamber; and a second tubular connecting means to deliver a stream of fluid coming from said main chamber; said auxiliary chamber being interposed between the said main chamber and the second tubular means; said auxiliary chamber being a flexible spherical body having diametrically opposite aligned tubular necks; one neck being inserted in said second tubular means and the other neck communicating with the main chamber; and filter means mounted in the auxiliary chamber neck adjacent the main chamber and extending from said neck into the said main chamber; said main chamber having inlet means shaped to deliver incoming fluid to a point where the flow can be seen.

8. A drip chamber for venoclysis equipment comprising, in combination: a rigid transparent main chamber; a first tubular connecting means extending up from said main chamber for debouching in a fluid container; flexible means directly associated with said rigid means for varying the effective internal volume in said main chamber by an amount greater than the interior volume of said tubular connecting means; said flexible means including an auxiliary chamber communicating with said main chamber and flexible walls defining at least a portion of said auxiliary chamber; a second tubular means to deliver a stream of fluid coming from said main chamber; said auxiliary chamber being interposed between the main chamber and the second tubular means; said auxiliary chamber being a flexible spherical body having diametrically opposite aligned tubular necks; one neck being inserted in said second tubular means and the other neck communicating with the main chamber; said auxiliary chamber neck communicating with the main chamber having integral walls flared out to seat over the end of the main chamber; said main chamber having inlet means spaced to deliver incoming fluid at a point where the flow can be seen.

9. A drip chamber for venoclysis equipment comprising, in combination: a rigid transparent main chamber; a first tubular connecting means extending up from said main chamber for debouching in a fluid container; means directly associated with the said rigid chamber for varying the effective internal volume of the said main chamber by an amount greater than the interior volume of said tubular connecting means, whereby an effective pumping action can be obtained by applying pressure to said means; said means including an auxiliary chamber communicating with said main chamber; said auxiliary chamber being a tube communicating with the main chamber at an oblique angle; said tube having a closely fitting plunger reciprocal therein; and a second tubular connecting means to deliver a stream of fluid coming from said main chamber; said main chamber having inlet means shaped to deliver incoming fluid at a point where the flow can be observed.

10. In venoclysis equipment for transferring parenteral fluids from a storage container to the veins of a patient through tubular connecting means, an improved drip chamber comprising a rigid transparent main chamber; a first tubular connecting means extending up from said main chamber and debouching in the fluid in said storage container; means directly associated with said main chamber for varying the effective volume of said main chamber by an amount greater than the interior volume of said tubular connecting means; a second tubular connecting means to deliver a stream of fluid coming from said main chamber; said main chamber having inlet means shaped to deliver incoming fluid at a point where the flow can be seen; said chamber being formed in telescoping parts, whereby relative axial movement of the parts is effective to vary the volume of the chamber; and mechanical stop means for preventing complete separation of the telescoping chamber parts.

11. In venoclysis equipment for transferring parenteral fluids from a storage container to the veins of a patient through tubular connecting means, an improved drip chamber comprising a rigid transparent main chamber, a first tubular connecting means extending upwardly from said main chamber and debouching into the fluid of said storage container, a second tubular connecting means to deliver a stream of fluid coming from said main chamber, said main chamber having inlet means shaped to deliver incoming fluid at a point where the flow can be seen; said main chamber having its walls cut away to form a plurality of laterally facing windows, and a flexible cover covering said windows; whereby lateral pressure on said cover distorts said cover within the contour of said main chamber and varies the effective volume thereof by an amount greater than the interior volume of said tubular connecting means.

GEORGE R. RYAN.

References Cited in the file of this patent

UNITED STATES PATENTS

| Number | Name | Date |
| --- | --- | --- |
| 1,786,090 | Schmidt et al. | Dec. 23, 1930 |
| 1,834,957 | Marlow | Dec. 8, 1931 |
| 1,869,443 | Stocklin | Aug. 2, 1932 |
| 1,988,624 | Kipp | Jan. 22, 1935 |
| 2,129,983 | Bacon | Sept. 13, 1938 |
| 2,414,240 | Page | Jan. 14, 1947 |
| 2,470,943 | Page | May 24, 1949 |

FOREIGN PATENTS

| Number | Country | Date |
| --- | --- | --- |
| 844,720 | France | Apr. 24, 1939 |
| 849,911 | France | Aug. 28, 1939 |

OTHER REFERENCES

Berkow, "Automatic transfusion apparatus made from an ordinary ear douche," Medical Journal and Record. July to December 1925, page 529. Copy in Div. 55.